(12) United States Patent
Korzeniowski

(10) Patent No.: US 7,408,440 B2
(45) Date of Patent: Aug. 5, 2008

(54) SYSTEM AND METHOD FOR ANALYZING MESSAGE INFORMATION FROM DIVERSE NETWORK DEVICES

(75) Inventor: Richard W. Korzeniowski, Canton, MI (US)

(73) Assignee: Electronics Data Systems Corporation, Plano, TX (US)

( * ) Notice: Subject to any disclaimer, the term of this patent is extended or adjusted under 35 U.S.C. 154(b) by 564 days.

(21) Appl. No.: 10/972,975

(22) Filed: Oct. 25, 2004

(65) Prior Publication Data

US 2006/0087408 A1    Apr. 27, 2006

(51) Int. Cl.
*G08B 9/00* (2006.01)

(52) U.S. Cl. .................. 340/286.02; 340/3.1; 340/506; 370/242

(58) Field of Classification Search ............ 340/286.02, 340/506, 517, 3.43, 3.1, 507; 370/242, 241, 370/216; 714/2, 47, 48
See application file for complete search history.

(56) References Cited

U.S. PATENT DOCUMENTS

| | | | |
|---|---|---|---|
| 5,774,377 A | 6/1998 | Eidson et al. | 364/550 |
| 6,239,699 B1 | 5/2001 | Ronnen | 340/517 |
| 6,253,339 B1 | 6/2001 | Tse et al. | 714/47 |
| 6,532,554 B1 * | 3/2003 | Kakadia | 714/43 |
| 6,697,970 B1 * | 2/2004 | Chisholm | 714/48 |
| 6,832,341 B1 | 12/2004 | Vijayan | 714/43 |
| 6,966,015 B2 | 11/2005 | Steinberg et al. | 714/47 |
| 7,002,905 B1 * | 2/2006 | Khouri et al. | 370/216 |
| 7,091,846 B2 * | 8/2006 | Wu | 340/506 |
| 7,131,037 B1 | 10/2006 | LeFaive et al. | 714/46 |
| 7,216,263 B2 | 5/2007 | Takaoka et al. | 714/47 |
| 7,246,156 B2 | 7/2007 | Ginter et al. | 709/217 |
| 2002/0021665 A1 | 2/2002 | Bhagavath et al. | 370/229 |
| 2002/0184354 A1 | 12/2002 | McKenzie et al. | 709/223 |
| 2003/0123442 A1 | 7/2003 | Drucker et al. | 370/392 |
| 2004/0044912 A1 | 3/2004 | Connary et al. | 713/201 |
| 2004/0133402 A1 | 7/2004 | Iwasawa | 702/188 |
| 2004/0210632 A1 | 10/2004 | Carlson et al. | 709/203 |
| 2004/0246893 A1 * | 12/2004 | Ahrens et al. | 370/216 |
| 2005/0272452 A1 | 12/2005 | Khoury et al. | 455/466 |
| 2006/0087409 A1 | 4/2006 | Korzeniowski | 340/286.02 |
| 2006/0168170 A1 | 7/2006 | Korzeniowski | 709/223 |

OTHER PUBLICATIONS

Author unknown, "Ciscoworks LAN Management Solution," white paper, Cisco Systems, printed from Cisco website on or about Aug. 2004, 4 pages.

* cited by examiner

*Primary Examiner*—Phung T. Nguyen
(74) *Attorney, Agent, or Firm*—Baker Botts L.L.P.

(57) ABSTRACT

A system for analyzing information relating to network devices comprises a computer readable storage medium and computer software stored on the computer readable storage medium. The computer software reviews message information generated by a plurality of network devices, stores event records associating events from the message information with the plurality of network devices, determines whether two or more duplicate events are within a time window, assigns a weighting value to at least some of the events, excluding at least some of the duplicate events in response to determining that the duplicate events are within the time window, calculates a total value for one of the plurality of network devices using the weighting values, and generates a report according to the total values calculated for the network devices.

20 Claims, 7 Drawing Sheets

| | 202 | 204 | 206 | 208 | 210 | 212 | 214 |
|---|---|---|---|---|---|---|---|
| | EVENT ID | DEVICE ID | EVENT TYPE | SOURCE | TIME | LOCATION | VALUE |
| 216 | 1 | 0.1.2.3 | high temperature | SysLog Server | 8-1-2004 8:00 AM | Building A | 1 |
| 218 | 2 | 0.1.2.3 | high temperature | SysLog Server | 8-1-2004 8:30 AM | Building A | 0 |
| 220 | 3 | 0.1.2.3 | high temperature | SysLog Server | 8-1-2004 9:00 AM | Building A | 0 |
| 222 | 4 | 0.1.2.3 | high temperature | SysLog Server | 8-1-2004 9:30 AM | Building A | 0 |
| 224 | 5 | 0.1.2.3 | high temperature | SysLog Server | 8-1-2004 10:00 AM | Building A | 2 |
| 226 | 5 | Print Server #4 | equipment malfunction | Alarm Log Server | 8-4-2004 9:00 AM | Building B | 3 |
| | ⋮ | ⋮ | ⋮ | ⋮ | ⋮ | ⋮ | ⋮ |
| 228 | N | 0.1.2.3 | loss of communication | User JSMITH | 8-5-2004 | Building A | 5 |

| Device ID | Total Value |
|---|---|
| 0.1.2.3 | 8 |
| ••• | ••• |
| Print Server #4 | 3 |

| Location | Total Value |
|---|---|
| Building A | 56 |
| Dallas Office | 32 |
| ⋮ | ⋮ |
| Santa Fe Factory, 4th Floor | 14 |

US 7,408,440 B2

SYSTEM AND METHOD FOR ANALYZING MESSAGE INFORMATION FROM DIVERSE NETWORK DEVICES

CROSS-REFERENCE TO RELATED APPLICATIONS

This application is related to U.S. Application Ser. No. 10/973,085, filed on 10/25, 2004, by Richard W. Korzeniowski and entitled "System and Method for Analyzing Information Relating to Network Devices,".

This application is related to U.S. Application Ser. No. 10/973,084, filed on 10/25, 2004, by Richard W. Korzeniowski and entitled "System and Method for Analyzing User-Generated Event Information and Message Information From Network Devices,".

TECHNICAL FIELD OF THE INVENTION

This invention relates to the field of information analysis and, more specifically, to a system and method for analyzing message information from diverse network devices.

BACKGROUND OF THE INVENTION

Data networks may include file servers, print servers, routers, switches, client computers, hubs, or other network devices. As the size and complexity of data networks have increased, it has become more difficult to analyze the status of the various network devices that make up the data network and to identify problems with the network devices that may warrant further investigation by administrators.

SUMMARY OF THE INVENTION

In accordance with the invention, a system and method for analyzing message information from diverse network devices is provided that substantially eliminates or reduces disadvantages or problems associated with previously developed systems and methods.

In one embodiment, a system for analyzing information relating to network devices comprises a computer readable storage medium and computer software stored on the computer readable storage medium. The computer software reviews message information generated by a plurality of network devices, stores event records associating events from the message information with the plurality of network devices, determines whether two or more duplicate events are within a time window, assigns a weighting value to at least some of the events, excluding at least some of the duplicate events in response to determining that the duplicate events are within the time window, calculates a total value for one of the plurality of network devices using the weighting values, and generates a report according to the total values calculated for the network devices.

The invention provides a number of important technical advantages. The invention efficiently and effectively identifies network devices that may be experiencing systemic problems and that may warrant further investigation. The invention can analyze message information sent from various manufacturers' devices and compensate for the fact that different manufacturers may send the same message more or less frequently. The invention may also analyze tickets generated by users. By considering both user and device information, the invention can provide a more accurate analysis of the operation of the network devices. Embodiments of the invention may have none, some, or all of these advantages without departing from the scope of the invention.

BRIEF DESCRIPTION OF THE DRAWINGS

For a more complete understanding of the present invention and the advantages thereof, reference is now made to the following descriptions taken in conjunction with the accompanying drawings in which:

FIG. 3 illustrates an exemplary table of event records;

FIG. 4 illustrates an exemplary table of network device information;

FIG. 5 illustrates an exemplary table including location information; and

DETAILED DESCRIPTION OF THE DRAWINGS

The preferred embodiment of the present invention and its advantages are best understood by referring to FIGS. 1 through 6 of the drawings, like numerals being used for like and corresponding parts of the various drawings.

Figure 1:
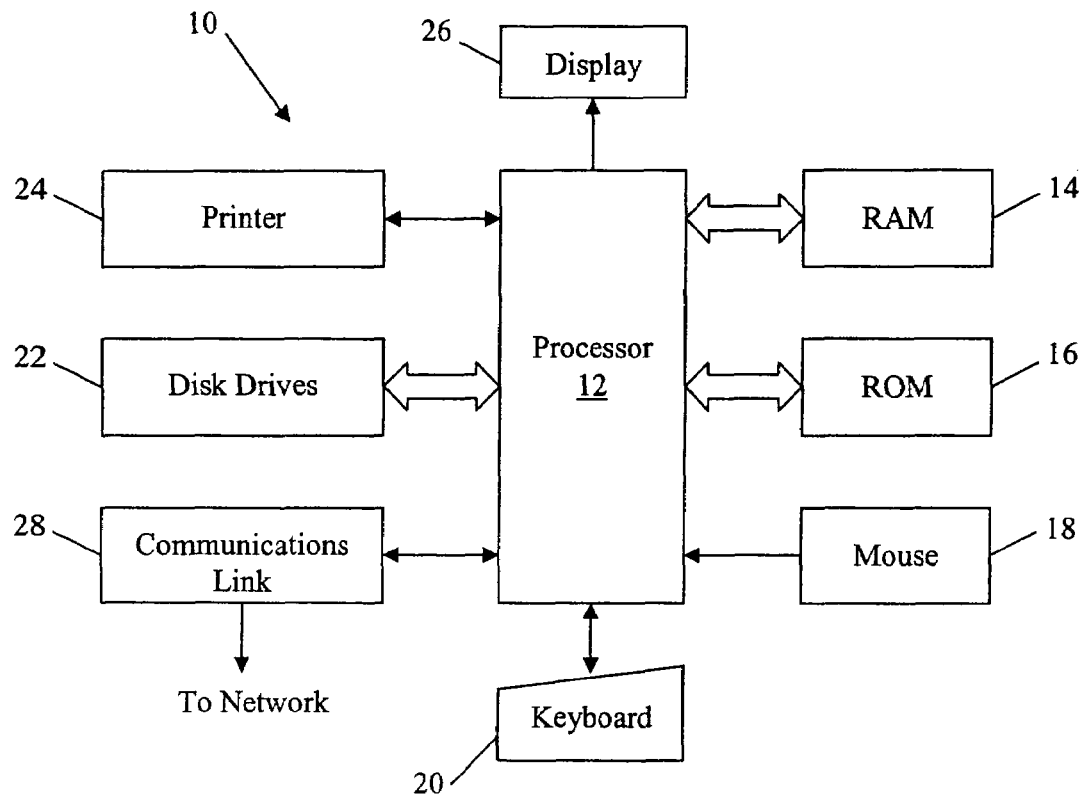
FIG. 1 illustrates a block diagram of a general purpose computer that may be used for analyzing information about network devices.

FIG. 1 illustrates a block diagram of a general purpose computer 10 that may be used for analyzing information relating to network devices.

General purpose computer 10 may be adapted to execute any of the well known MS-DOS, PC-DOS, OS2, UNIX, MAC-OS and Windows operating systems or other operating systems. As used in this document, operating system may refer to the local operating system for computer 10, a network operating system, or a combination of both. General purpose computer 10 comprises processor 12, random access memory (RAM) 14, read only memory (ROM) 16, mouse 18, keyboard 20, and input/output devices such as printer 24, disk drives 22, display 26 and communications link 28. The present invention includes programs that may be stored in RAM 14, ROM 16, or disk drives 22 and may be executed by processor 12. Communications link 28 is connected to a computer network but could be connected to a telephone line, an antenna, a gateway, or any other type of communication link. Disk drive 22 may include a variety of types of storage media such as, for example, floppy disk drives, hard disk drives, CD ROM drives, DVD-ROM drives, or magnetic tape drives. Disk drive 22 may also include a network disk housed in a server within the enterprise network. Software for the invention may be stored on one or more storage media located on one or more computers. Although this embodiment employs a plurality of disk drives 22, a single disk drive 22 could be used without departing from the scope of the invention. FIG. 1 only provides one example of a computer that may be used with the invention. The invention could be used with computers other than general purpose computers as well as general purpose computers without conventional operating systems.

Figure 2:
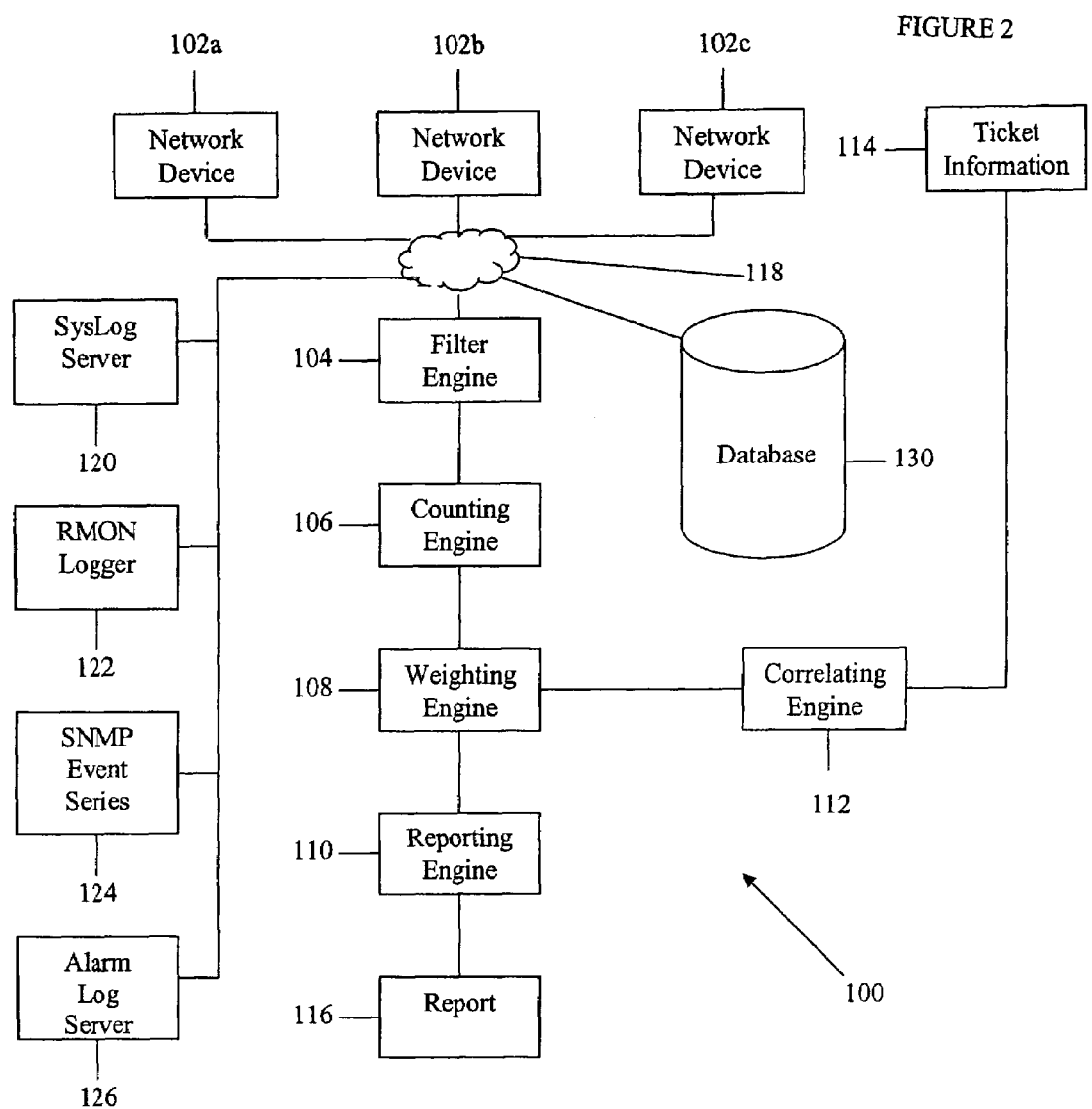
FIG. 2 illustrates a block diagram of one embodiment of a system for analyzing information relating to network devices.

FIG. 2 illustrates a block diagram of a system 100 for analyzing information relating to network devices 102a, 102b, and 102c (collectively, network devices 102). System 100 may include filter engine 104, counting engine 106, weighting engine 108, reporting engine 110, and correlating engine 112. System 100 may review message information generated by network devices 102 and/or review ticket information 114 generated by users. System 100 may also analyze the events described in the event information and ticket information, and generates a device report 116. Other components may be included in system 100 or some of these components excluded without departing from the scope of the invention. In addition, the components of system 100 may be arranged in a different manner. The functions performed by system 100 may be performed by one computer or multiple computers.

Network devices 102 may include file servers, print servers, routers, switches, client computers, hubs, or any other processing or communication device coupled to a data network 118. Network devices 102 may generate and communicate messages relating to their status or operation. In some embodiments, a server may poll one or more network devices 102 for such messages if they are not automatically communicated or if further data may be obtained. These messages may be in different formats depending on the type of network device 102, the manufacturer of network device 102, the type of messages, or other factors. Network devices 102 may generate and communicate, for example, SysLog messages, RMON messages, SNMP event traps, alarm messages, or any other messages relating to the operation or status of network devices 102.

Network devices 102 may generate SysLog messages and communicate the SysLog messages to a SYS LOG server 120, which stores the messages in the form of a text log. In a particular embodiment, network devices 102 may be programmed to send diagnostic or error related messages to designated SYS LOG servers 120, as identified by their data network address or name. Device manufacturers typically define the scope and detail of these messages. In a particular embodiment, messages may include a level or grade which identifies the importance of the message. For example, a message assigned a low level may merely include operational information, and a message assigned a high level may indicate a severe system failure. In a particular embodiment, a user may be able to select the level of messages that network devices 102 send to SysLog server 120 or that SysLog server 120 stores and retains.

Network devices 102 may send RMON messages or traps to an RMON logger 122. RMON logger 122 is a server which collects RMON messages and provides them for review. Network devices 102 may send the RMON messages, for example, when status or operational information exceeds a threshold defined within network devices 102. For example, in a particular embodiment, when operational values, such as CPU utilization, are above or below RMON program thresholds, network devices 102 may send RMON messages and related details to RMON logger 122.

Network devices 102 may send SNMP event traps to an SNMP event server 124. SNMP event server 124 expects messages in predefined SNMP formats. Depending on the messaging levels reported, SNMP event server 124 may indicate network operational status via text or graphical user interfaces.

Alarm log server 126 may monitor network devices 102 and generate alarm logs. Alarm log server 126 may receive any combination of SYS LOG messages, RMON messages or traps, SNMP event traps, or other messages from network devices 102. In addition, in some embodiments, alarm log server 126 may perform active interrogation of network devices 102 and their environment. Alarm log server 126 generates alarm logs which may contain copies of these messages as well information inferred by alarm log server 126.

Filter engine 104 may review message information generated by network devices 102 and identify events relating to network devices 102 for further analysis. In a particular embodiment, filter engine 104 sends direct inquiries, such as SQL queries, to databases 130 associated with SYS LOG server 120, RMON logger 122, SNMP event server 124, and alarm log server 126. In an alternative embodiment, filter engine 104 may review text-based reports from SYS LOG server 120, RMON logger 122, SNMP event server 124, and alarm log server 126.

Filter engine 104 may use various searches or filters to identify events relating to network devices 102 for further analysis. For example, in a particular embodiment, filter engine 104 may use a table of text strings to identify significant events for analysis or may use a table of text strings to identify events which are not significant. Filter engine 104 may identify matches to these text strings by using wildcard comparisons to the body of the message information. In a particular embodiment, filter engine 104 may use any combination of day-of-the-week, time-of-day designations, site-identifiers, device-identifiers, or other filters to identify message information that are related to significant events or to identify message information that may be ignored.

In a particular embodiment, filter engine 104 may filter out and ignore messages that are insignificant to network performance as determined by the user of system 100. For example, network devices 102 may generate message information that relate to their performance but are not indicative of any problems, such as messages relating to processor usage, memory usage, or other status information. Filter engine 104 may filter out these message because they are not useful to identify network devices 102 that may have problems that warrant further investigation. Other embodiments may not filter out any messages.

Filter engine 104 stores event records about the events identified from the message information. Filter engine 104 may store event records in database 130 or any other suitable data storage means. The event records may associate each identified event with network device 102 with which the event relates. Network devices 102 may be identified by name, number, data network address, or any other information suitable for identifying network devices 102. In addition, the event records may associate each event with an event type, which is a defined class or group of events. The event records may associate each event with a source, which could include any suitable combination of SysLog server 120, RMON logger 122, SNMP event server 124, alarm log server 126, or other network devices 102 from which filter engine 104 received message information about the event. The event records may associate each event with a time at which the event occurred. The time may include any combination of year, month, day, hour, minutes, seconds or other suitable temporal information. The event records may also identify the location of network device 102 with which the event relates. The location may includes any combination of country, state, county, city, street address, zip code, building, floor, or other information suitable for identifying the location of network device 102. Filter engine 104 may use arrays, linked lists, pointers, or any other suitable data structures to store these associations.

Counting engine 106 may normalize the event information by reducing duplicate events. Some network devices 102 may repeat a message periodically, resulting in many duplicate messages sent to SysLog server 120, RMON logger 122, NSMP event server 124, or alarm log server 126 over a period of time. For example, network device 102 may reach a temperature over a particular threshold and send a message relating to this event to SysLog server 120 once every hour until the condition is corrected. Based on this message information, filter engine 104 may identify duplicate events relating to each of the duplicate messages. These duplicate events may skew any analysis of network devices 102, for example, by over-weighting the significance of the duplicate events. To normalize the event information, counting engine 106 may count duplicate events within a defined time window as a single event or other number of events less than the actual number of duplicate messages.

Counting engine 106 may store time window information regarding a time window in which particular messages from particular network devices 102 are counted only a single time. In a particular embodiment, counting engine 106 may use a time window of a particular length for all events. In an alternative embodiment, counting engine 106 may use different time windows depending on any combination of the types of network devices 102, the particular network device 102, the types of events, the sources of the events, the locations of network devices 102, or any other suitable criteria. For example, events relating to network device 102a may be associated with a longer time window than events relating to another network device 102b because network devices 102a and 102b may be different types of network device 102. Different devices 102 may exhibit different behavior, thus justifying different time windows. Alternatively, event types that are less significant, such as temperature events, may be associated with a longer time window than more significant event types, such as a catastrophic network outage. In such embodiments, the time window information may associate time windows with network device types, particular network devices 102, event types, sources, locations, or other factors, and counting engine 106 may use the time window information to identify which time window to apply to particular duplicate events. For example, counting engine 106 may identify one of the time windows to apply to the duplicate events by determining an event type of the duplicate events and identifying the time window associated with that event type according to the time window information stored in database 130. Alternatively, counting engine 106 may identify one of the time windows to apply to the duplicate events by identifying network device 102 associated with the duplicate events according the event information stored in database 130 and identifying a time window associated with network device 102 according to the stored time window information.

Counting engine 106 may determine whether two or more duplicate events are within a time window and delete the duplicate events within the time window. In a particular embodiment, counting engine 106 works together with filter engine 104 to determine which events are included in the event records stored in database 130. In such an embodiment, filter engine 104 may not store event records for all duplicate events but only for a subset of the duplicate events identified by counting engine 106 (and that are to be counted and not filtered out). In an alternative embodiment, filter engine 104 stores event records for all duplicate events in database 130, and counting engine 106 may delete some of the event records to reduce the duplicate events to a smaller number of events. In yet another embodiment, counting engine may select a subset of the event records for further analysis and identify the selected subset of event records for further processing by weighting engine 108.

In a particular embodiment, the time window may be a sliding time window which has a beginning and end defined relative to the time of the duplicate events. For example, the time window may begin at the time of the earliest event, and counting engine 106 may disregard duplicate messages received prior to the end of the time window. After the end of the time window, counting engine 106 may identify and count the next duplicate event and begin another time window at the time of that duplicate event.

In an alternative embodiment, the time window may be a fixed time window which has a beginning and end defined independent of the duplicate events. For example, the time window may be defined relative to a clock, and each time window may begin at the point where the prior window ends. In such an embodiment, counting engine 106 may determine whether there are two or more duplicate events within a time window and reduce the duplicate events to a single event by either not counting the additional duplicate events, deleting the additional duplicative events from the event information stored in database 130, or by selecting and identifying the single event for further analysis by weighting engine 108.

Weighting engine 108 may receive event information from the event records and assign a value to each event according to the event's relative importance. Weighting engine 108 may assign a value to each event based on any combination of the type of network device 102 associated with the event, the type of event, or any other suitable criteria. For example, in a particular embodiment, weighting engine 108 may give a greater value to a more operationally significant event than to a less operationally significant event. In an alternative embodiment, weighting engine 108 may assign a greater value to events that are associated with a more operationally significant network device 102 than similar events associated with a less operationally significant network devices 102. In another particular embodiment, weighting engine 108 may assign values to events according to the source of the event information. For example, weighting engine 108 may assign events that were identified from alarm log server 126 a higher value than events that were identified from SysLog server 120. As would be understood by a person skilled in the art, a programmer may design weighting engine 108 to assign values to events according to any suitable criteria. In a particular embodiment, users may select or otherwise determine the rules used by weighting engine 108 to assign values to events.

Weighting engine 108 may use various models to assign values to events. In a particular embodiment, weighting engine 108 may use a straight weighting model in which each event of a particular type is assigned the same value. Such a straight weighting model may be appropriate where any occurrence of an event would be of the same significance regardless of the timing or number of events. In an alternative embodiment, weighting engine 108 may use a simple linear model in which recurring events are given greater value in a linear fashion. For example, weighting engine 108 may assign a given value to a particular event relating to a particular network device 102, and use a linear scale to assign greater values to each subsequent event of the same type relating to the same network device 102. In another alternative embodiment, weighting engine 108 may use an exponential model in which weighting engine 108 assigns greater values to recurring events according to an exponential as opposed to linear scale. Such an exponential model may be appropriate where network devices 102 do not send a great deal of messages relating to a particular event but the event is critical in nature, and thus each subsequent event should be given a greater weight.

Weighting engine 108 may also calculate a total value for each network device 102 according to the values assigned to the events. Weighting engine 108 may store network device information associating the calculated total values with each network device 102 in database 130. In a particular embodiment, weighting engine 108 may add the values assigned to each event associated with network device 102 to calculate the total value for network device 102.

Weighting engine 108 may also calculate a total value for each site or location according to the values assigned to the events. Weighting engine 108 may store location information associating the calculated total values with each location in database 130. In a particular embodiment, to calculate the total value for a location, weighting engine 109 may add the weighted values assigned to each event associated with network devices 102 at that location. In an alternative embodiment, to calculate the total value for a location, weighting engine 109 may add the total value associated with each network device 102 at that location. Similar values could be calculated for subsets of a location or for a combination of locations or subsets thereof. For example, a value could be calculated for those network devices 102 within the responsibility of a group of information technology (IT) professionals.

Some embodiment may not include the functionality described above with reference to weighting engine 108. Alternatively, weighting engine 108 could be implemented in combination with filtering engine 104 and/or counting engine 106. For example, instead of counting engine 106 discarding duplicate events, weighting engine 108 may just assign smaller values to each duplicate event.

Reporting engine 110 may generate various reports 116 relating to network devices 102. Reporting engine 110 may generate reports 116 based on particular types of events. For example, reporting engine 110 may analyze events relating to the level of activity of network devices 102 and generate reports 116 identifying network devices 102 that were most active over a given time period. For example, report 116 may be a list of network devices 102 in order from most active to least active. Such report 116 may be used to identify network devices 102 that are especially critical and may warrant special attention.

Reporting engine 110 may produce reports 116 identifying the locations experiencing problems that warrant further investigation. Using the location information stored in database 130, reporting engine 110 may identify the total values associated with the locations (which may include multiple network devices 102) and generate reports 116 according to these total values. In a particular embodiment, reporting engine 110 may generate report 116 listing locations in order of the total values associated with each location. In an alternative embodiment, reporting engine 110 may identify the locations with associated total values above a defined threshold and generate report 116 listing those identified locations. With these reports 116, reporting engine 110 may identify locations that warrant further investigation.

Reporting engine 110 may produce reports 116 identifying particular network devices 102 that are experiencing problems warranting further investigation. Using the network device information stored in database 130, reporting engine 110 may identify the total values associated with network devices 102 and generate reports 116 according to these total values. In a particular embodiment, reporting engine 110 may determine whether the total value associated with each network device 102 is greater than a threshold value, and generate report 116 identifying network devices 102 with total values greater than the threshold. In an alternative embodiment, reporting engine 110 may generate report 116 listing network devices 102 in order according to the total values associated with each network device 102. Reporting engine 110 may produce reports based on historic data over any suitable period of time. In a particular embodiment, weighting engine 108 may analyze event information from database 130 over a long period of time to identify problems that are infrequent but may show up repeatedly over a long period of time.

Reporting engine 110 may produce report 116 which lists network devices 102 that have consistently suffered problems over time as determined by the network device information stored in database 130. Network devices 102 which consistently have repeated problems may have systemic issues or the problems may have not been effectively resolved. Report 116 may allow users to determine the effectiveness of employees in resolving issues with network devices 102. For example, if the number of network devices 102 with repeat problems increases over time, it could be an indication that an applied problem resolution process is not effective. On the other hand, a decrease in the number of repeat devices over time could indicate an effective problem identification and remediation process. A chart of the count of repeat devices versus time provides a simple graphic illustration of these conditions.

In some embodiments, system 100 may also include correlating engine 112 which processes ticket information generated by users. Correlating engine 112 may review ticket information 114 generated by users, identify one or more ticket events relating to network devices 102, and store event records associating each identified ticket event with one of network devices 102. The ticket events identified by correlating engine 112 may include problems with network devices 102 reported by users. Weighting engine 108 and reporting engine 110 then process the event records stored by correlating engine 112 in the same manner as the event records stored by filter engine 104 and counting engine 106.

The invention may make use of a typical ticketing system. As a example an organization may have a help desk for computer users in the organization. A user may call the help desk complaining about a problem, such as, for example, slow email service. An IT staff member may log this complaint into a ticketing system that may store ticket information about the complaint, such as, for example, the time of the reporting the malfunction, etc. Such a system may have predefined fields to describe the malfunction, a text narrative field for that purpose, or a combination of both.

Like filter engine 104, correlating engine 112 may store the event records in database 130 or any other suitable data storage means. The event records may associate each identified ticket event with network device 102 to which the ticket event relates. Network devices 102 may be identified by name, number, data network address, or any other information suitable for identifying network devices 102. Where no such associated is provided, correlating engine 112 may use information for a ticket and information about the network to determine potential network device 102 involved. For example, based on the identity of the user who submitted the ticket information, correlating engine 102 may be able to identify network devices 102 used by that user. In addition, the event records may associate each event with an event type, which is a defined class or group of events. The event records may associate each ticket event with a source, which would be the user or the user's computer that generated ticket information 114 from which correlating engine 112 identified the event. The event records may associate each ticket event with a time at which the user generated ticket information 114. The time may include any combination of year, month, day, hour, minutes, seconds or other suitable temporal information. The event records may also identify the location of network device 102 to which the ticket event relates. The location may includes any combination of country, state, county, city, street address, zip code, building, floor, or other information suitable for identifying the location of network device 102. Like filter engine 104, correlating engine 112 may use arrays, linked list, pointers, or any other suitable data structures to store these associations.

In a particular embodiment, users may use a software program to report events relating to the operation of network devices 102. For example, the users may be able to select an event from predefined options presented using a drop down menu or other suitable means. In addition, the software may automatically associate the ticket information generated by the user with one of network devices 102 based on a name, data network address, or other information suitable to identify network device 102. In a particular embodiment, the software automatically associates the users' ticket information with network devices 102 using Internet Protocol addresses of network devices 102.

In an alternative embodiment, users may manually fill out paper tickets reporting a problem or other event with one of network devices 102, and the ticket information may be subsequently entered into database 130 or other memory accessible by correlating engine 112.

Database 130 may include network configuration information that correlating engine 112 may use in storing event records. Correlating engine 112 may identify one of network devices 102 related to a ticket event, retrieve network configuration information related to identified network device 102, and associate that network configuration information with the ticket event in the event records stored in database 130. Database 130 may include several different databases. For example, in a particular embodiment, one database 130 may store the network configuration information, and another database 130 may store the event records.

Weighting engine 108 and reporting engine 110 may process the event records stored by correlating engine 112 in the same manner as the event records stored by filter engine 104 and counting engine 106. In a particular embodiment, weighting engine 108 may assign ticket events a higher value when they are linked to other events from network devices 102.

By taking into account ticket events, system 100 may generate report that provide more information about network device 102. For example, the ticket event may amplify the importance of other events identified in message information from network devices 102. In addition, the ticket events may identify problems that are not reflected in the message information generated by network devices 102. As a result, system 100 may provide a more complete and more accurate analysis of network devices 102 by also taking into account ticket events generated by users.

FIG. 3 is an exemplary table 200 of event records. System 100 may store event records in database 130 or other suitable data storage means using arrays, linked lists, pointers, or any other suitable data structures. Filter engine 104 and counting engine 106 may stores event records from network devices 102. Correlating engine 112 may store and/or analyze event records derived from ticket information 114 generated by users. Using the event records, weighting engine 108 and/or reporting engine 110 may analyze network devices 102 and generate reports relating to network devices 102.

Column 202 identifies events relating to the operation of network devices 102. Although the event identifiers in column 202 are numbers, system 100 may use any combination of names, addresses, or other suitable information to identify the events.

Column 204 associates an event in column 202 with one or more of network devices 102. System 100 may use any combination of names, data network addresses, or other suitable information to identify network devices 102. In the illustrated embodiment, column 204 includes an Internet Protocol address (0.1.2.3) to identify a router, and a name (Print Server #4) to identify a print server.

Column 206 associates an event in column 202 with an event type. An event type may include any information relating to the operation of network device 102 identified in column 204. For example, in the illustrated embodiment, column 206 includes high temperature, equipment malfunction, and loss of communication as event types.

Column 208 associates an event identified in column 202 with the source of the information relating to that event. If the event information originated from message information generated by network devices 102, the source identified in column 208 may be SYS LOG server 120, RMON logger 122, SNMP event server 124, or alarm log server 126. If the event information originated from ticket information 114 generated by users, the source in column 208 may identify the particular user or the user's computer that generated ticket information 114.

Column 210 associates an event identified in column 202 with the time at which the event was recorded. The time may include any combination of year, month, day, hour, minutes, seconds or other suitable temporal information. The time identified in column 202 may be a time stamp generated by SYS LOG server 120, RMON logger 122, SNMP event server 124, or alarm log server 126. If the event information originated from ticket information 114 generated by a user, the time identified in column 210 may be a date or a time identified by the user of the occurrence or when the ticket was prepared.

Column 212 identifies a location that includes network device 102 identified in column 204 and which is associated with the event identified in column 202. The location may include any combination of country, state, city, street address, zip code, building, floor, or other suitable information to identify a location of one or more network devices 102. The location may be the physical location of the network device or the location of users served by the device.

Column 214 indicates the value that weighting engine 108 assigns to an event identified in column 202. As illustrated in table 200, weighting engine 108 may not assign a value to duplicate events within a time window. In the illustrated embodiment, the events listed in rows 218, 220, and 222 are not assigned a value because they fall within the same time window as the event listed in row 216. As explained above, weighting engine 108 may increase the value assigned to an event of a particular event type. For example, in the illustrated embodiment, the high temperature event in row 216 is assigned a value of 1, and the subsequent high temperature event associated with the same network device 102 in row 224 is assigned the value of 2.

FIG. 4 illustrates a table 300 of network device information generated by weighting engine 108. As described above, weighting engine 108 may calculate a total value for each network device 102 using the values assigned to each event identified in the event records stored in table 200 and store network device information associated by the calculated total value with network devices 102. Reporting engine 110 uses the network device information to generate reports relating to network devices 102. Normally, the total values will reflect the total value within a particular time frame.

Column 302 identifies network devices 102. Column 302 may include any combination of data network addresses, names, numbers, or other suitable information to identify network devices 102.

Column 304 associates network devices 102 identified in column 302 with a total value. As described above, weighting engine 108 calculates a total value for network devices 102 using the values assigned to the events associated with network device 102. In a particular embodiment, weighting engine 108 adds the values assigned to the events related to network device 102 to arrive at a total value for network device 102. Using column 304, weighting engine may associate the calculated total values with network devices 102 in column 302. Using the total values in column 304, reporting engine 110 may generate reports 116 relating to associated network device 102 in column 302. In a particular embodiment, reporting engine 110 lists network devices 102 in order according to the total value in column 304 associated with each network device 102 in column 302. In an alternative embodiment, reporting engine 110 may identify a subset of network devices 102 in column 302 that are associated with a total value in column 304 above a defined threshold. In some embodiments, weighting engine 108 may add up separate totals for different classes of events associated with particular network devices 102.

FIG. 5 is a table 400 including location information. Weighting engine 108 may calculate a total value for each location and may store location information associating the calculated total values with the locations. Reporting engine 110 may use the location information to generate report 116 relating to network devices 102.

Column 402 identifies locations including network devices 102. The locations identified in column 402 may include any combination of country, state, county, city, street address, building, floor, or other suitable information to identify locations including network devices 102. Also, the location could be a set of network resources assigned to particular IT staff.

Column 404 associates a total value with the locations identified in column 402 and stores the calculated total values in column 404. Weighting engine 108 may calculate a total value for each location in column 402. In a particular embodiment, to calculate a total value for a location weighting engine 108 identifies network devices 102 associated with the location and adds the total value associated with each identified network device 102 in table 300. Reporting engine 110 generates a report relating to network devices 102 using the location information in table 400. In a particular embodiment, reporting engine 110 generates a list of locations in column 402 in order according to the total values in column 404. In an alternative embodiment, reporting engine 110 may identify the locations in column 402 associated with total values in column 404 above a defined threshold.

Figure 6:
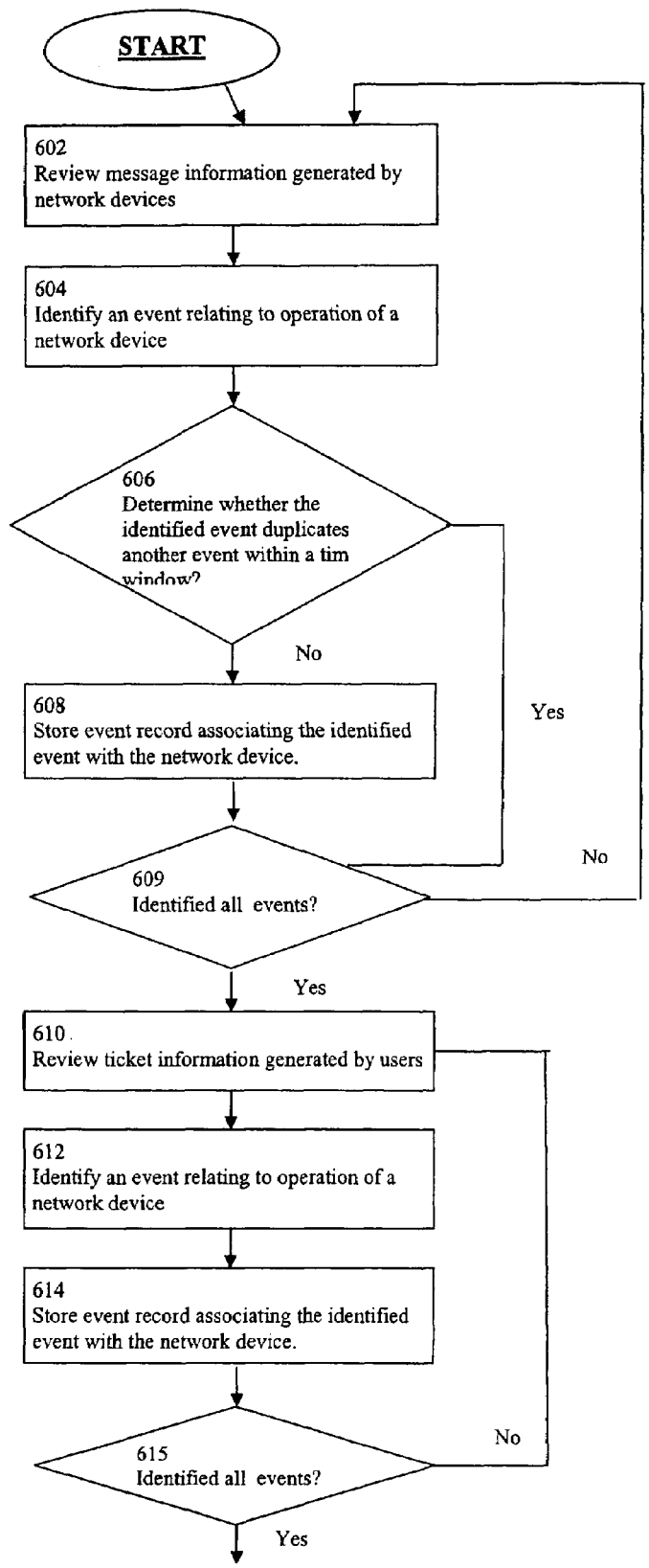
FIG. 6 is a flowchart of an exemplary method for analyzing information from network devices.
Figure 6:
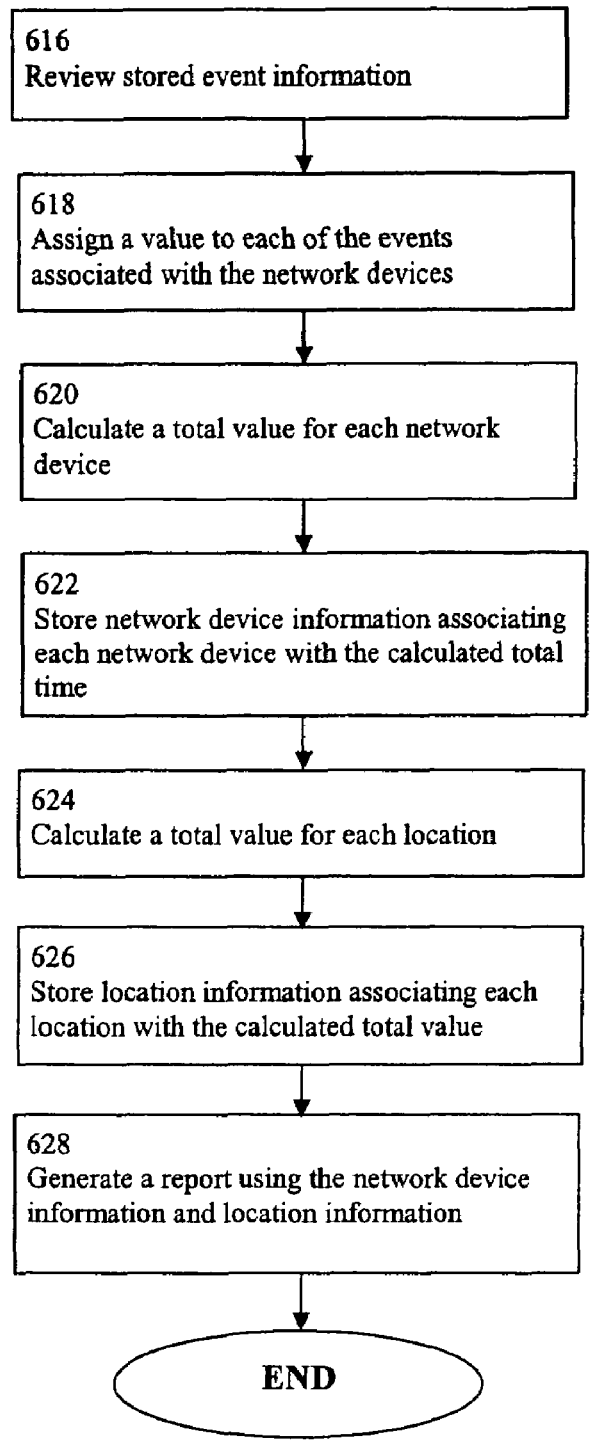

FIG. 6 is a flow chart of a method of analyzing event information about network devices 102. The method begins at step 602, where filter engine 104 reviews message information generated by network devices 102. At step 604, filter engine 104 identifies an event relating to the operation of one of network devices 102. At step 606, counting engine 106 determines whether the identified event duplicates another event within a time window. If counting engine 106 determines that the identified event is not a duplicate of another event within a time window at step 606, counting engine 106 stores an event record associating the identified event with network device 102, and the method continues at step 609. In an alternative embodiment, filter engine 104 may store event records for all identified events, and counting engine 106 may delete duplicate events (or simply not count them) from the event records stored in database 130 or select and identify a subset of the duplicate event for further analysis by weighting engine 108. If counting engine 106 determines that the identified event is a duplicate of another event within a time window at step 606, the method continues at step 609. In some embodiments, steps 602-609 may be omitted.

At step 609, filter engine 104 determines whether it has identified all events in the message information (normally within a particular time window). If filter engine 104 has not identified all events, the method returns to step 604; otherwise, the method continues to step 610.

At step 610, correlating engine 112 reviews ticket information generated by users. Correlating engine 112 identifies an event relating to the operation of one of network devices 102 from the ticket information at step 612, and correlating engine 112 stores an event record associating the identified event with network device 102 at step 614. In some embodiments, steps 610-615 may be omitted.

At step 615, correlating engine 112 determines whether it has identified all events in the ticket information. If correlating engine 112 has not identified all events, the method returns to step 612; otherwise, the method continues to step 616.

At step 616, weighting engine 108 reviews the event records stored in database 130. At step 618, weighting engine 108 assigns a value to each of the events associated with network devices 102. As described above, weighting engine 108 may assign the values according any combination of suitable factors and using any suitable models. Weighting engine 108 calculates a total value for each network device 102 at step 620 (or a plurality of total values based upon classes of events) and stores network device information associating each network device 102 with the calculated total value at step 622. In a particular embodiment, weighting engine 108 stores the network device information using a table 300. Weighting engine 108 calculates a total value for each location at step 624 and stores location information associating each location with its total calculated value at step 626. In a particular embodiment, weighting engine 108 stores the location information using a table 400. In some embodiments, steps 616-626 may be omitted. In other embodiments, weights may all be the same and will not vary based upon various characteristics of an event or groups of events.

At step 628, reporting engine 110 generates reports 116 using the network device information and location information stored in database 130. In a particular embodiment, reporting engine 110 may generate report 116 listing network devices 102 in order of the total value associated with each network device 102. In an alternative embodiment, reporting engine 110 may generate report 116 identifying network devices 102 associated with a total value greater than a defined threshold. In an alternative embodiment, reporting engine 110 may generate report 116 listing locations in order according to the total value associated with each location. In an alternative embodiment, reporting engine 110 may generate report 116 identifying locations associated with a total value greater than a defined threshold. Other reports may also be generated without departing from the scope of the invention.

Reporting engine 110 may also generate emails, alarms, or other notifications to identify network devices 102 or locations that warrant further investigation. In a particular embodiment, reporting engine 110 determines whether a total value associated with network device 102 is greater than a defined threshold and generates a notification to investigate network device 102 in response to determining that the total value associated with network device 102 is greater than the defined threshold.

Although embodiments of the invention and advantages are described in detail, a person skilled in the art could make various alterations, additions, and omissions without departing from the spirit and scope of the present invention as defined by the appended claims.

To aid the patent office, and any readers of any patent issued on this application in interpreting the claims appended hereto, applicants wish to note that they do not intend any of the appended claims to invoke paragraph 6 of 35 U.S.C. § 112 as it exists on the date of filing hereof unless "means for" or "step for" are used in the particular claim.

What is claimed is:

1. A system for analyzing information relating to network devices, comprising
    a computer readable storage medium;
    computer software stored on the computer readable storage medium and operable to:
        review message information generated by a plurality of network devices
        store event records associating events from the message information with the plurality of network devices;
        determine whether two or more duplicate events are within a time window;
        assign a weighting value to at least some of the events, excluding at least some of the duplicate events in response to determining that the duplicate events are within the time window;
        calculate a total value for one of the plurality of network devices using the weighting values; and
        generate a report according to the total values calculated for the network devices.

2. The system of claim 1, wherein the software is further operable to:
    store time window information associating each of a plurality of event types with one of a plurality of time windows; and
    use the time window information to identify the time window to apply to the duplicate events according to an event type of the duplicate events.

3. The system of claim 1, wherein the software is further operable to:
    to store time window information associating each of a plurality of network devices with one of a plurality of time windows; and
    use the time window information to identify the time window to apply to the duplicate events according to a network device associated with the duplicate events.

4. The system of claim 1, wherein the timing window has a beginning and an end defined relative to a time of at least one of the duplicate events.

5. The system of claim 1, wherein the timing window has a beginning and an end defined independent of the duplicate events.

6. The system of claim 1, wherein the software is further operable to delete one or more of the duplicate events from the event records in response to determining that the duplicate events are within the time window.

7. The system of claim 1, wherein the software is further operable to select a subset of the duplicate events to be assigned a weighting value in response to determining that the duplicate events are within the time window.

8. The system of claim 1, wherein the software is further operable to exclude at least some of duplicate events that are later in time from being assigned a weighting value in response to determining that the duplicate events are within the time window.

9. The system of claim 1, wherein the software is further operable to calculate a total value for a location using the weighted values assigned to events associated with the location.

10. The system of claim 1, the software is further operable to receive user-reported information, correlate the user-reported information with a network device, and use the user-reported information in calculating the total values.

11. A method for analyzing information relating to network devices, comprising
    reviewing message information generated by a plurality of network devices
    storing event records associating events from the message information with the plurality of network devices;
    determining whether two or more duplicate events are within a time window;
    assigning a weighting value to at least some of the events, excluding at least some of the duplicate events in response to determining that the duplicate events are within the time window;
    calculating a total value for one of the plurality of network devices using the weighting values; and
    generating a report according to the total values calculated for the network devices.

12. The method of claim 11, further comprising:
    storing time window information associating each of a plurality of event types with one of a plurality of time windows; and
    using the time window information to identify the time window to apply to the duplicate events according to an event type of the duplicate events.

13. The method of claim 11, further comprising:
    storing time window information associating each of a plurality of network devices with one of a plurality of time windows; and
    using the time window information to identify the time window to apply to the duplicate events according to a network device associated with the duplicate events.

14. The method of claim 11, wherein the timing window has a beginning and an end defined relative to a time of at least one of the duplicate events.

15. The method of claim 11, wherein the timing window has a beginning and an end defined independent of the duplicate events.

16. The method of claim 11, further comprising deleting one or more of the duplicate events from the event records in response to determining that the duplicate events are within the time window.

17. The method of claim 11, further comprising selecting a subset of the duplicate events to be assigned a weighting value in response to determining that the duplicate events are within the time window.

18. The method of claim 11, further comprising excluding at least some of duplicate events that are later in time from being assigned a weighting value in response to determining that the duplicate events are within the time window.

19. The method of claim 11, further comprising calculating a total value for a location using the weighted values assigned to events associated with the location.

20. The method of claim 11, further comprising:
    receiving user-reported information;
    correlating the user-reported information with a network device; and
    using the user-reported information in calculating the total values.

* * * * *